United States Patent Office 3,403,146
Patented Sept. 24, 1968

3,403,146
MONO- OR DI-SUBSTITUTED CYANURIC CHLO-
RIDE REACTED WITH STARCH AND THE PROD-
UCTS THEREOF
Walter G. Hunt, Bridgeton, Mo., assignor to Anheuser-
Busch Incorporated, St. Louis, Mo., a corporation of
Missouri
No Drawing. Filed Mar. 24, 1965, Ser. No. 442,535
6 Claims. (Cl. 260—233.3)

ABSTRACT OF THE DISCLOSURE

A starch derivative made by reacting a mono- or di-substituted cyanuric chloride compound with starch whereby the triazine ring links a material to the starch. The reaction is under alkaline conditions and permits attaching compounds which cannot ordinarily be coupled to starch. Under extreme conditions, a mono-substituted triazine ring also can be made to cross-link the starch. In addition, a mono-substituted material can be merely attached to the starch without cross-linking under less harsh conditions. Optical bleaching agents, fungicides, insecticides, etc., are representative of the materials which can be linked to starch in this manner.

---

This invention relates to new starch derivatives and to the process of making same, and in particular this invention relates to the preparation of substituted cyanuric chloride derivatives of starch in the granule form.

The use of the triazine ring permits linking to polysaccharides many compounds which cannot be coupled with normal condensing agents such as anhydrides, halides of organic acids, and phosgene.

Starches of the types described, while they have new and valuable properties of their own, are also useful as intermediates in preparation of still other derivatives based on starch. These may possess both the properties of the chemical groups added and properties of starch such as hot water solubility and adhesiveness.

Many dyestuffs (Boyle, C., Industrial Chemist and Chemical Manufacturer 15, 331 (1939)) have been prepared by linking together already known dyestuffs or intermediates through a triazine ring. Surface active agents (Hentrich, W., and E. Schirm U.S. Patent 2,394,306) have been prepared by reacting cyanuric chloride with water soluble compounds containing at least one primary and/or secondary amino group and at least one lipophile group. Optical bleaching agents, fungicides, and insecticidal compounds also are easily condensed with cyanuric chloride. Representative examples of such compounds are as follows:

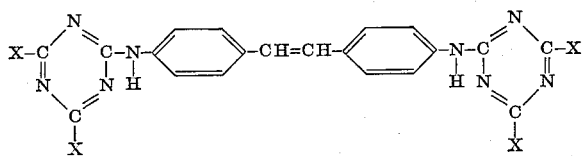

Optical bleaching agent

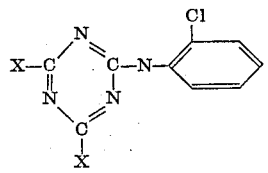

Fungicide

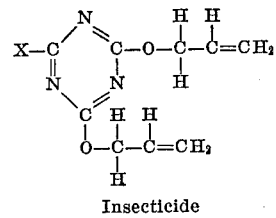

Insecticide

These and other examples of mono- and di-substituted cyanuric chloride compounds are conventionally reported in the literature and form no particular part of the present invention.

In the reaction of cyanuric chloride with such compounds the reactivity of cyanuric chloride may be compared to the acid chlorides. The rate of reaction of syanuric chloride is dependent upon various factors such as solubility, temperature of reaction, and the nucleophilic compound taking part in the reaction. Most of the reactions of cyanuric chloride involve the chloride groups, although reactions sometimes may occur at the ring nitrogens. The chloride groups represent the centers of high reactivity and the value of the structure is that one, two, or all three may be reacted selectively. In addition, the reactivity of chlorotriazines is also dependent upon the substituents substituted on the triazine nucleus. It is therefore possible with certain nucleophiles to substitute one, two, or all of the chloride groups of the triazine nucleus under certain reaction conditions. By selecting the proper reaction conditions the mono- and di-substituted cyanuric chloride compounds containing functional groups having the foregoing described properties may be prepared.

The principal object of this invention is to couple the foregoing described mono- and di-substituted cyanuric chloride compounds with starch by displacing the remaining chloride group of the triazine nucleus with the nucleophilic groups of the polysaccharide. These substituted triazine compounds may be represented by the following:

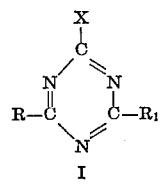 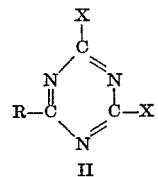

I
DISUBSTITUTED CYANURIC
CHLORIDE COMPOUND

II
MONOSUBSTITUTED
CYANURIC CHLORIDE
COMPOUND wherein X is chloride, and R and $R_1$ may be amino, N-substituted amino, N,N-disubstituted amino, alkoxy, aryloxy, or the corresponding thio compounds. The use of the triazine nucleus as a coupling agent renders it possible to prepare a series of starch derivatives in granule form containing functional groups having the previously described properties which could not be prepared using other coupling agents. In this manner compounds having fungicidal and insecticidal properties may be chemically linked to a polysaccharide carrier for more effective distribution. If an aqueous dispersion is desired then more stable dispersions may be prepared using an aqueous dispersable carrier such as a water soluble polysaccharide.

Still another object of this invention is to prepare a starchoxy-triazine compound having cationic properties.

A further object of this invention is to prepare an aminochloro-starchoxy triazine compound.

These and other objects and advantages will become apparent hereinafter.

The reaction between the above mentioned triazine compounds and starch may be represented by the following three equations:

1.

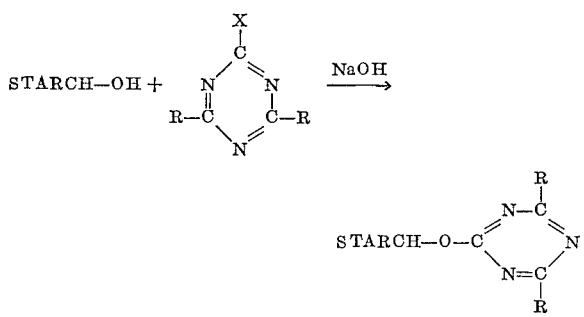

2.

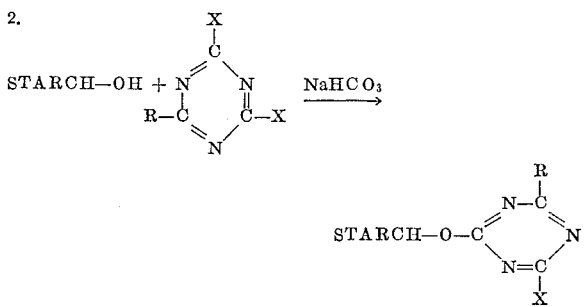

3.

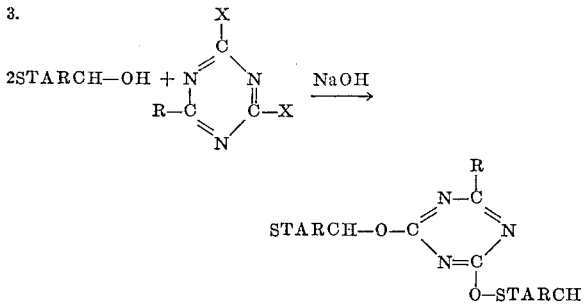

These triazine-substituted compounds react with starch using alkaline catalysts to form the corresponding ethers; however, if a gelatinizable starch compound is desired, then the triazine intermediate must be free of cyanuric chloride. It is well known in the art that when polyfunctional derivatizing agents, such as cyanuric chloride, are used the starch ethers thus formed are nongelatinizable in boiling water, when sufficient quantities of the agents are used.

In carrying out the process of our invention the previously described mono- or dichloro-triazine compound is added to an aqueous starch suspension which has been made alkaline by the addition of an alkali metal hydroxide or any other water-soluble base (as for example sodium bicarbonate or calcium hydroxide). Since the degree of substitution and type of substituted substituent has an effect on the reactivity of chloro-triazines, it is generally necessary to use fairly high concentrations of alkali metal hydroxides to displace the third chlorine atom of the triazine nucleus. (Reaction 1.) In order to keep the starch in the granule form, a gelatinization inhibitor such as sodium sulfate must be used to prevent the swelling of the starch granule at this high pH. The rate of reaction is dependent upon temperature and any temperature below the gelatinization temperature of the starch in the reaction medium may be used; temperatures just below this gelatinization point are preferred.

The second chlorine atom of the triazine nucleus is considerably more reactive than the third, therefore to displace it does not require the high alkaline conditions necessary to displace the third chlorine atom. (Reaction 2.) In carrying out the process to react starch with a monosubstituted dichloro-triazine compound, weak bases, such as tri-sodium phosphate or sodium carbonate, may be used to catalyze this reaction. Though the reaction proceeds at room temperature, mild heating (80°–100° F.) tends to speed the reaction. This procedure generally displaces but one of the chlorine atoms since the starch is not sufficiently cross-linked to prevent swelling; however, if cross-linking and a nongelatinizable starch derivative is desired, then the first set of reaction conditions may be employed (Reaction 3.)

At the conclusion of the reaction period the slurry may be neutralized with acid (sulfuric) and the salts are then removed by filtration and washing.

In order to obtain higher degrees of alkalinity an inert solvent such as acetone may be used as a reaction medium. A soluble catalyst, such as tetra-methyl ammonium hyydroxide, is used and the slurry is then heated to complete the reaction.

From about 1% to about 10% by weight, based on the weight of starch, substituted triazine may be added to the starch. These amounts of reactant corresponds to a degree of substitution in the range of about 0.01 to about 0.11. The temperature of reaction may be 50–100° C. depending on the gelatinization point in the reaction medium used, and on the desired final product. The pH must be greater than 7, with the upper limit depending on the desired final product and the other variables. The time of reaction may be from 1 to 48 hours.

The reaction has been carried out on raw unmodified starch and is applicable to all raw, acid-modified, oxidized or otherwise modified or partially derivatized starches such as wheat, potato, tapioca, waxy maize, sago, or rice, as well as the separated constituents of ordinary starches such as amylose and amylopectin.

The invention is further described in the following examples.

Example I

This example illustrates the reaction of a di-substituted cyanuric chloride derivative with starch using the principles in Reaction 1.

To 800 ml. of water containing 100 grams $Na_2SO_4$ are added 500 grams of unmodified corn starch and 43 grams of 2,4-diamino-6-chloro-s-triazine. To this, 100 ml. of an aqueous solution containing 20 grams NaOH is slowly added. The slurry is reacted for 16 hrs. at 110° F., then neutralized and dried. A portion of the starch derivative is continuously extracted with dioxane for 24 hours to remove the unreacted reagent. The material assays 1.98% N which corresponds to a degree of substitution of 0.05. The degree of substitution is defined as the average number of triazine groups per each anhydroglucose unit of starch ($C_6H_{10}O_5$). Gelatinization temperatures are measured in a Corn Industries Viscometer using a slurry containing 5% starch solids. This sample gelled at 74° C. and the paste showed no retrogradation on standing.

Example II

This example illustrates the reaction of a mono-substituted cyanuric chloride derivative with starch using the principles described in Reaction 2.

To 800 ml. of water are added 500 grams of unmodified corn starch and 20 grams of 2-diethylamino-4,6-dichloro-s-triazine. The pH of the slurry is raised to 9, using dilute sodium carbonate solution, and maintained at that pH for 2 hrs. at 100° F. At the end of that time, the starch derivative is washed and dried. A portion is then extracted with dioxane for 24 hours to remove unreacted reagent. The material assayed 0.59% N for a degree of substitution of approximately 0.02. A 5% suspension gelled at 78° C. indicating that little or no cross-linking occurred.

Example III

This example illustrates the reaction of a mono-substituted cyanuric chloride derivative with starch using the conditions described in Reaction 3.

To 800 ml. of water are added 500 grams of unmodified corn starch and 20 grams of 2-diethylamino-4,6-dichloro-s-triazine. 12 grams of NaOH in 100 ml. water is then added slowly. The starch slurry initially thickens indicating that the starch granule is swelling, however as the reaction progresses, the slurry thins. After the addition of the NaOH solution, the slurry is stirred at room temperature for 5 hours. The slurry is then neutralized and the starch collected by filtration. A 5% suspension does not swell appreciably in boiling water, indicating the starch is cross-linked.

It was found that on converting these amino starch derivatives to their corresponding hydrochloride salts, the salts had a low affinity for the anionic dye, Light Green SF Yellowish, showing that the salts carried a slight cationic charge.

This invention is intended to cover all changes and modifications of the examples herein chosen for purposes of the disclosure, which do not constitute departures from the spirit and scope of the invention.

What is claimed is:

1.

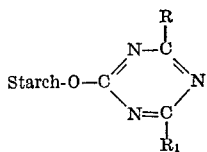

in granular form where at least one of R and $R_1$ is selected from the group consisting of amino, N-substituted amino, N,N-disubstituted amino, alkoxy, aryloxy, or the corresponding thio compounds, and R or $R_1$ may be a chloro group, the degree of substitution being in the range of about 0.01 to about 0.11.

2.

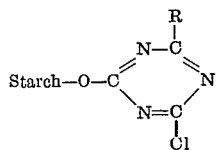

in granular form where R is selected from the group consisting of amino, N-substituted amino, N,N-disubstituted amino, alkoxy, aryloxy, or the corresponding thio compounds, the degree of substitution being in the range of about 0.01 to about 0.11.

3.

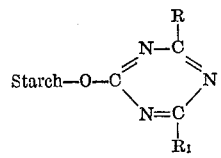

in granular form where R and $R_1$ are selected from the group consisting of amino, N-substituted amino, N,N-disubstituted amino, alkoxy, aryloxy, or the corresponding thio compounds, the degree of substitution being in the range of about 0.01 to about 0.11.

4. A method of making a starch derivative including the steps of reacting starch with

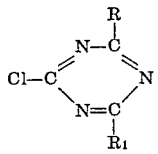

where at least one of R and $R_1$ is selected from the group consisting of amino, N-substituted amino, N,N-disubstituted amino, alkoxy, aryloxy, or the corresponding thio compounds, and R or $R_1$ may be a chloro group, under alkaline conditions at a temperature of about 50 to 100° C. for about 1 to 48 hours, and recovering a starch product of the formula

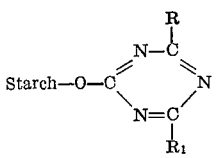

the reactant added to the starch being in the range of about 1% to about 10% by weight.

5. The method of claim 4 including the step of recovering a granular starch product.

6. The method of claim 4 wherein the reactant is mono-substituted, the reaction is carried out at a pH of greater than about 11, and including the step of recovering a cross linked starch product.

References Cited

UNITED STATES PATENTS

| | | | |
|---|---|---|---|
| 2,910,467 | 10/1959 | Wimmer | 260—233.3 |
| 2,805,220 | 9/1957 | Gerwitz | 260—233.3 |

DONALD E. CZAJA, *Primary Examiner.*

R. W. MULCAHY, *Assistant Examiner.*